United States Patent
Bynum et al.

(10) Patent No.: US 9,774,815 B2
(45) Date of Patent: Sep. 26, 2017

(54) LOCKING MOUNT FOR SET TOP BOX

(71) Applicants: Bobby L. Bynum, Maylene, AL (US); Taylor L. Jackson, West Collierville, TN (US); Sonny L. Desmond, Remlap, AL (US)

(72) Inventors: Bobby L. Bynum, Maylene, AL (US); Taylor L. Jackson, West Collierville, TN (US); Sonny L. Desmond, Remlap, AL (US)

( * ) Notice: Subject to any disclaimer, the term of this patent is extended or adjusted under 35 U.S.C. 154(b) by 194 days.

(21) Appl. No.: 14/852,505

(22) Filed: Sep. 12, 2015

(65) Prior Publication Data

US 2016/0080681 A1 Mar. 17, 2016

Related U.S. Application Data

(60) Provisional application No. 62/049,446, filed on Sep. 12, 2014.

(51) Int. Cl.
| | |
|---|---|
| H04N 5/655 | (2006.01) |
| A47B 1/06 | (2006.01) |
| F16M 13/00 | (2006.01) |
| A47G 29/087 | (2006.01) |
| A47B 81/06 | (2006.01) |

(52) U.S. Cl.
CPC ........... *H04N 5/655* (2013.01); *A47B 81/061* (2013.01); *A47G 29/087* (2013.01); *F16M 13/00* (2013.01); *Y10T 403/606* (2015.01)

(58) Field of Classification Search
CPC .......... H04N 5/64; H04N 5/655; F16M 13/00; F16M 13/02; F16M 2200/024; A47B 81/06; A47B 81/061; G06F 1/1605; G06F 1/1679; G06F 1/1601; Y10T 403/599; Y10T 403/606
USPC ....... 348/836, 843, 838; 361/679.23, 679.57, 361/679.58, 724, 725, 726; 725/151; 248/221.11, 222.11
See application file for complete search history.

(56) References Cited

U.S. PATENT DOCUMENTS

| | | | | |
|---|---|---|---|---|
| 8,070,123 | B2 * | 12/2011 | Yu | F16M 11/105 248/346.06 |
| 8,787,007 | B2 * | 7/2014 | Stokman | G06F 1/1607 248/489 |
| 9,252,572 | B2 * | 2/2016 | Ogle | H05K 5/0278 |
| 9,360,156 | B2 * | 6/2016 | Shirley | F16M 13/02 |
| 2008/0099646 | A1 * | 5/2008 | Kobara | G06F 1/1601 248/309.1 |
| 2008/0186669 | A1 * | 8/2008 | Chang | G06F 1/1607 361/679.02 |

(Continued)

FOREIGN PATENT DOCUMENTS

| | | | |
|---|---|---|---|
| CN | 201332468 Y | * | 10/2009 |
| CN | 201919127 U | * | 8/2011 |

(Continued)

*Primary Examiner* — John Villecco
(74) *Attorney, Agent, or Firm* — William E. Pitts

(57) ABSTRACT

A locking mount for set top box having a base, a plurality of mounting holes, two springy retainers, two flanges, two lips and a front stop edge for securely mounting a set top box such as a digital to analog converter box or similar electronic device to a mounting surface and locking the device into position so as to prevent theft by using springy retainers to engage pre-existing holes or slots on the device to a mounting surface is provided.

2 Claims, 7 Drawing Sheets

(56) References Cited

U.S. PATENT DOCUMENTS

| | | | |
|---|---|---|---|
| 2009/0294599 A1* | 12/2009 | Chen | G06F 1/1607 248/65 |
| 2010/0148026 A1* | 6/2010 | Jang | G06F 1/1607 248/224.8 |
| 2010/0271764 A1* | 10/2010 | Gardes | G06F 1/1607 361/679.01 |
| 2010/0314515 A1* | 12/2010 | Coleman | F16M 13/02 248/220.21 |

FOREIGN PATENT DOCUMENTS

| | | | |
|---|---|---|---|
| CN | 202074206 U | * | 12/2011 |
| CN | 203176688 U | * | 9/2013 |
| CN | 206036583 U | * | 3/2017 |
| KR | 101113127 B1 | * | 2/2012 |
| KR | 101175601 B1 | * | 8/2012 |
| KR | 101676679 B1 | * | 11/2016 |

* cited by examiner

LOCKING MOUNT FOR SET TOP BOX

CROSS-REFERENCE TO RELATED APPLICATIONS

This application claims an invention which was disclosed in Provisional Application No. 62/049,446, filed Sep. 12, 2014, entitled "Locking Mount for Set Top Box." The benefit under 35 U.S.C. §119(e) of the U.S. provisional application is hereby claimed, and the aforementioned application is hereby incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The present invention is in the technical field of electronic device mounts and more particularly, relates to apparatus for securely mounting an electronic set top box such as a digital to analog converter box or other portable electronic box to a mounting surface such as a wall or stand.

BACKGROUND OF THE INVENTION

As the television industry has moved from analog to digital signal transmission, set top boxes have begun to be widely used, particularly in the hospitality industry. Because such devices are relatively expensive and portable, theft is a common and widespread problem which affects hospitality service providers.

Lockable or secure mounting devices for similar electronic equipment have been proposed, but are not tailored to the industry. Further such devices are cumbersome, not easily mountable and are often difficult to access for service to the housed device.

SUMMARY OF THE INVENTION

The present invention is a locking mount for securely mounting an electronic set top box such as a digital to analog converter box, satellite signal converter box or similar electronic box device to a mounting surface and locking the electronic box or device into position so as to prevent theft by using springy retainers to engage pre-existing holes or slots on the electronic box being mounted.

DETAILED DESCRIPTION OF THE INVENTION

Figure 1:
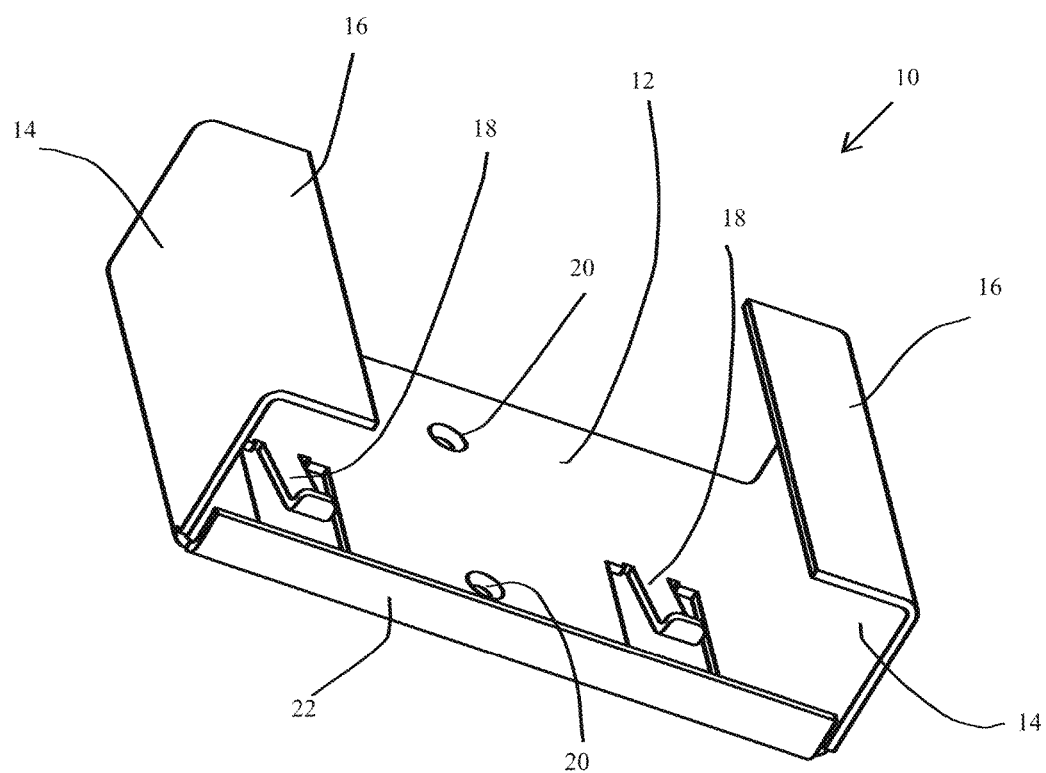
FIG. 1 is a perspective view of a locking mount for set top box of an exemplary embodiment of the present invention.

Referring now to the invention in more detail, in FIGS. 1-7 there is shown an exemplary embodiment of a locking mount for set top box 10 comprising a base 12, a plurality of mounting holes 20, two springy retainers 18, two flanges 14, two lips 16 and a front stop edge 22.

In further detail, as shown FIGS. 1, 3, 4 and 5, the base 12 is a shaped plate member which is to be adhered to a flat surface, for example a wall or table. The two flanges 14 extend outwardly perpendicular to the base 12 and are provided with lips 16 whose free edges project toward each other and parallel to the base 12. The two flanges 14 and lips 16 are spaced from each other and the base 12, respectively, at sufficient distances to define a channel for receiving a set top box or similar electronic device such as a digital to analog converter box while still allowing for adequate ventilation to the top side of the device to prevent overheating (See FIG. 5). The front stop edge 22 protrudes outwardly perpendicular to the base 12 a sufficient distance to preclude such a device from sliding out of the channel formed by the base 12, flanges 14 and lips 16 but not so far as to preclude normal operation of the set top box or similar device using a remote control. The front stop edge also prevents access to the springy retainers 18 from the front of the locking mount for set top box 10. The springy retainers 18 are bilaterally protruded from the base 12.

Figure 2:
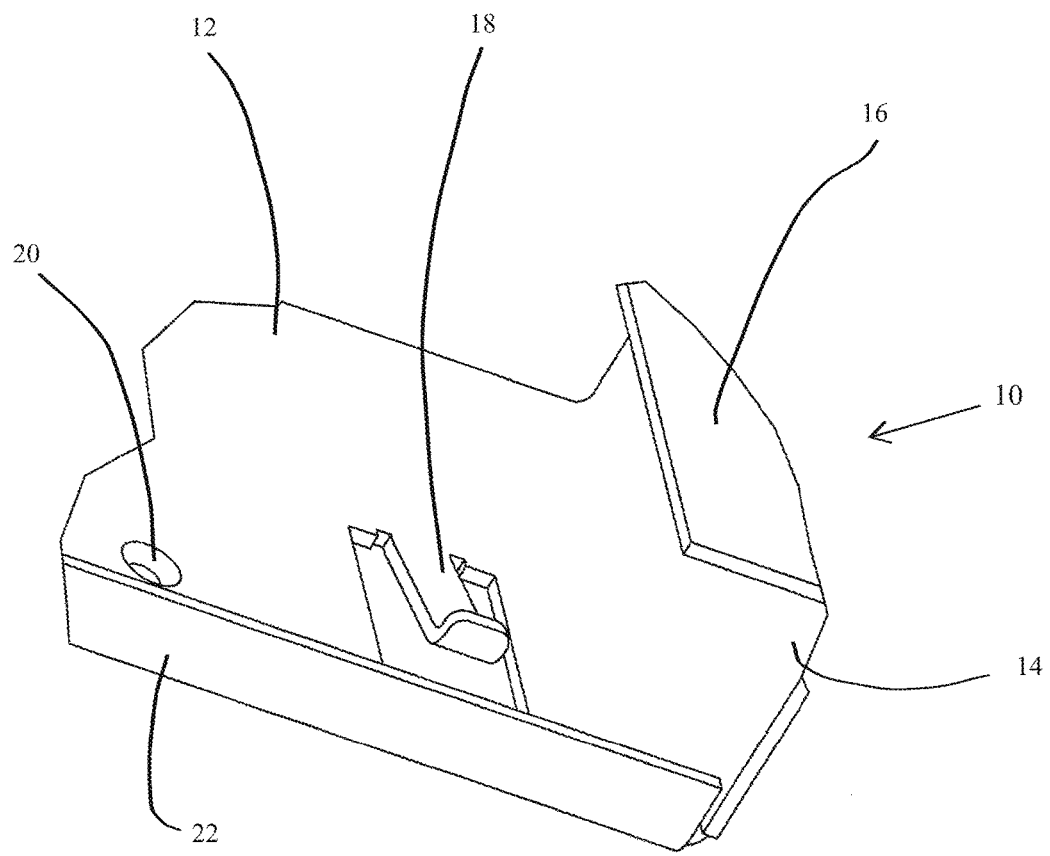
FIG. 2 is an enlarged view of part of FIG. 1 showing one springy retainer and one corner of a locking mount for set top box of an exemplary embodiment of the present invention.
Figure 3:
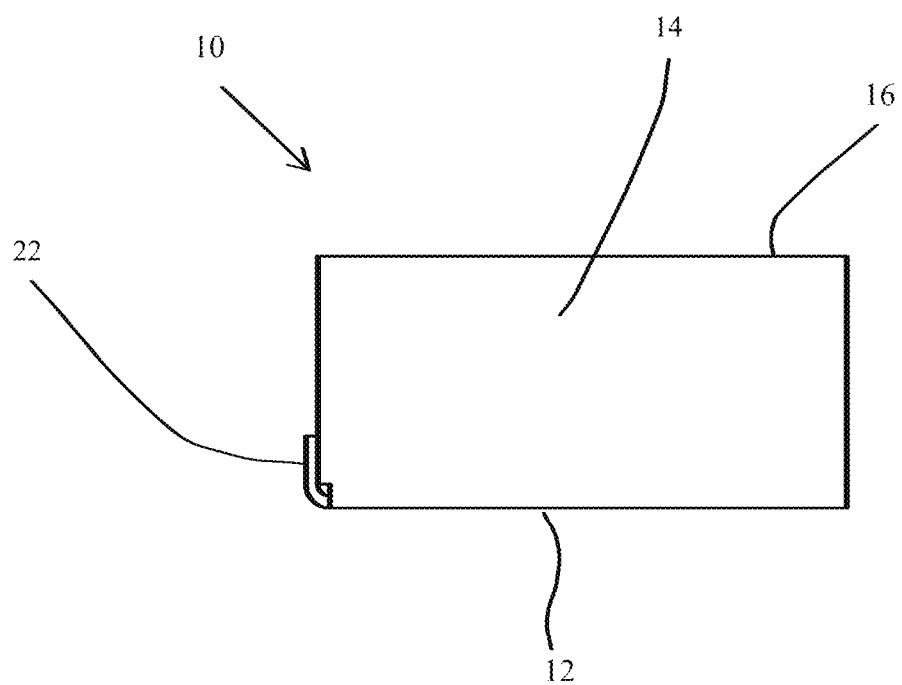
FIG. 3 is a side view of a locking mount for set top box of an exemplary embodiment of the present invention, the opposite side being a mirror image of the side shown.
Figure 4:
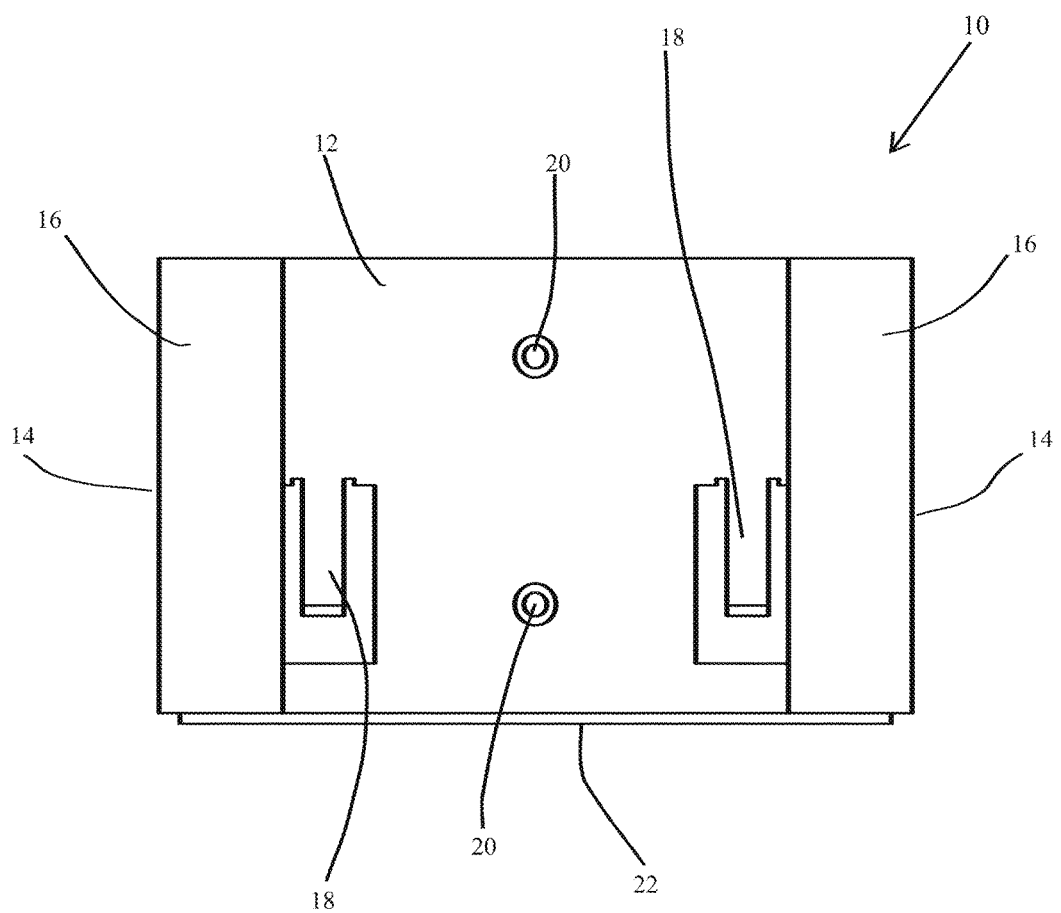
FIG. 4 is a top view of a locking mount for set top box of an exemplary embodiment of the present invention.

FIG. 2 shows the relationship between one of the springy retainers 18, a flange 14, a lip 16, a mounting hole 20, the base 12, and the front stop edge 22.

Figure 5:
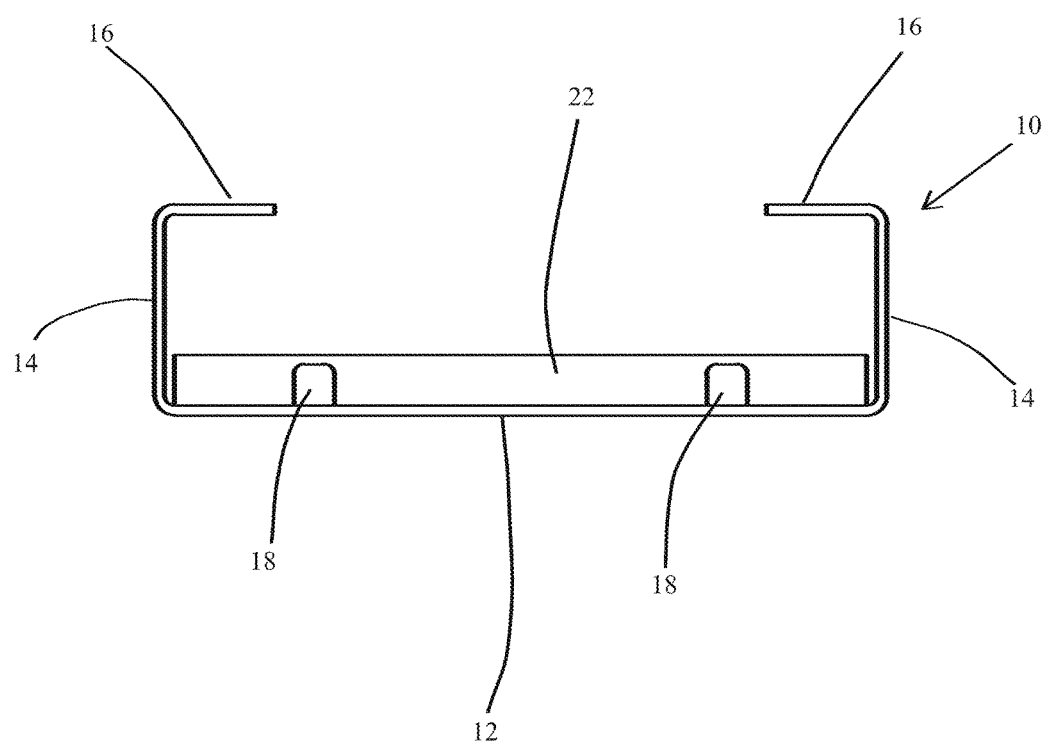
FIG. 5 is a rear view of a locking mount for set top box of an exemplary embodiment of the present invention.
Figure 6:
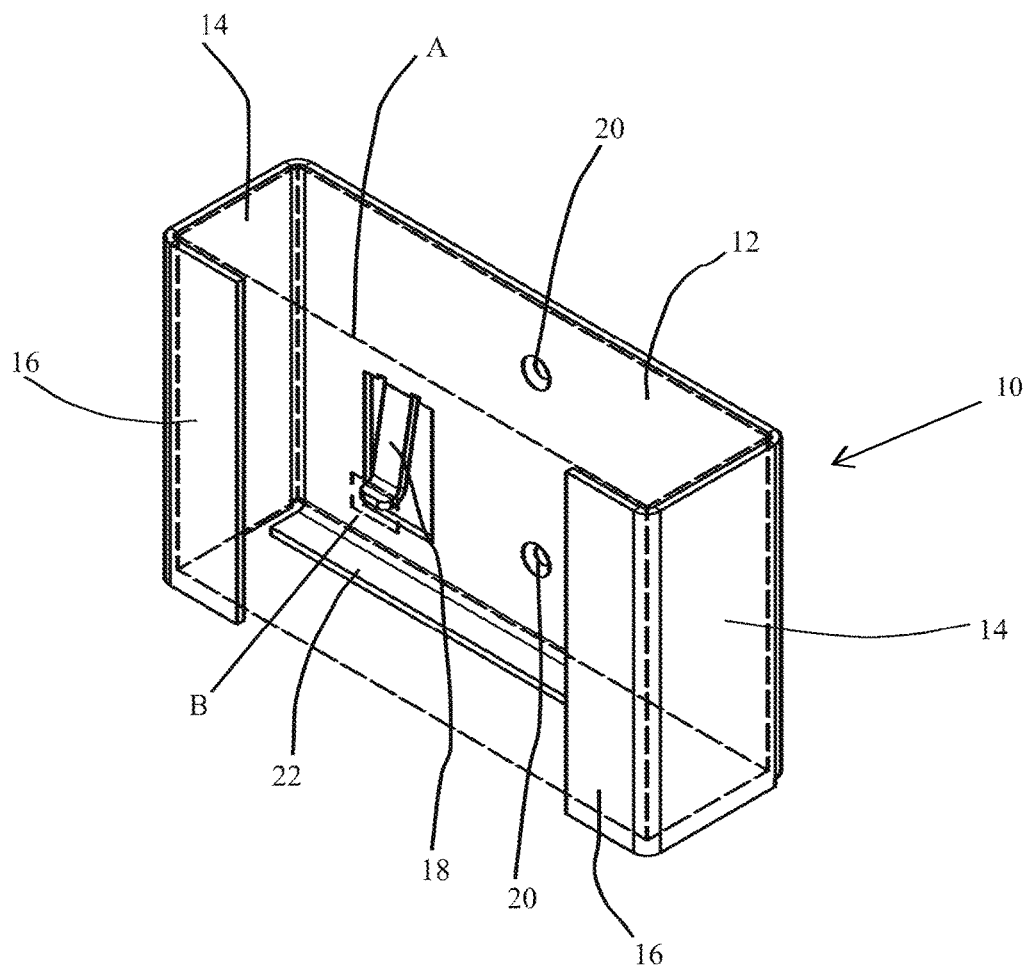
FIG. 6 is a perspective view of a locking mount for set top box of an exemplary embodiment of the present invention showing an imaginary set top box held securely according to the present invention.
Figure 7:
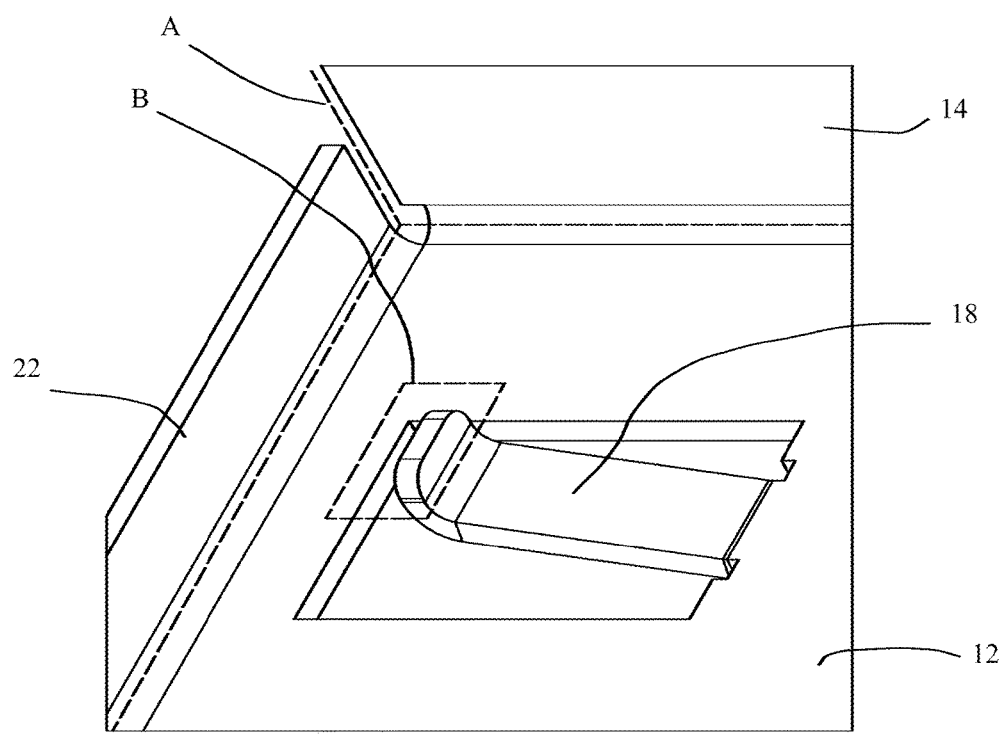
FIG. 7 is an enlarged view of a part of FIG. 6 showing an imaginary set top box being engaged by one of the springy retainers.

FIG. 5 more clearly shows the channel formed by the base 12, flanges 14 and lips 16. The front stop edge 22 is also visible. The springy retainers 18 bilaterally protrude from the base 12. Referring now to FIGS. 6 and 7, when loading a set top box such as digital to analog converter box or similar electronic device (see the imaginary line A in FIGS. 6 and 7) and mounting the device to a flat surface such as a wall or table, insert fastening members such as screws or the like through the mounting holes 20 of the base 12 and then drive the fastening members into the wall or table to affix the locking mount for set top box to the wall or table. The set top box such as a digital to analog converter box or similar device is then loaded from the rear of the locking mount for set top box 10 and slid into position so that the front of the set top box or similar device abuts the front stop edge 22. When the set top box or similar device is fully inserted into the locking mount for set top box 10, the springy retainers 18 engage pre-existing holes or slots B on the set top box so that the box or other similar device is locked in a secure position and may not then be removed from the locking mount for set top box 10 except with the aid of a tool for depressing the springy retainers 18.

FIG. 7 shows the relationship between one of the pre-existing holes or slots B of the imaginary set top box A and one of the springy retainers 18 of the locking mount for set top box 10. A flange 14, the base 12 and the front stop edge 22 are shown for point of reference. The construction details of the invention as shown in FIG. 1-7 are that the locking mount for set top box 10 may be made of any sufficiently rigid and strong material such as high-strength plastic, metal, and the like and may be stamped, machined or molded depending on the material used. The size of the base 12, distance between the flanges 14 and distance between the lips 16 and the base 12 may be altered to accommodate various sizes of set top boxes or similar electronic devices without altering the basic purpose, function and construction of the invention. Likewise, a simple change in the location, spacing and shape of the springy retainers 18, can enable the locking mount for set top box 10 to accommodate and secure multiple sizes and types set top boxes and similar devices.

While the foregoing written description of the exemplary embodiment of the invention enables one of ordinary skill to make and use what is considered presently to be the best mode thereof, it has been provided for the purposes of illustration and description. It is not intended to be exhaustive or to limit the invention to the precise form disclosed. Those of ordinary skill will understand and appreciate the existence of variations, combinations, and equivalents of the specific embodiment and examples herein. The invention should therefore not be limited by the above described embodiment, method, and examples, but by all embodiments and methods within the scope and spirit of the invention as claimed.

What is claimed is:

1. A locking mount for a set top box comprising:
a base, rectangular in shape, having a first end, a second end, a front end, a back end, a top surface and a bottom surface, said base having at least two integral springy retainers which protrude bilaterally therefrom to engage a bottom surface of the set top box; two flanges which extend outwardly from said first end and said second end, respectively, perpendicular to said base and parallel to each other, said flanges having lips whose free edges project inwardly toward each other and parallel to the top surface of said base, the two flanges being spaced a distance from each other and the lips being spaced a distance from the top surface of the base to define a channel for receiving set top box; a plurality of mounting holes formed through the top surface and the bottom surface of said base for mounting to a surface with fastening means and a front stop edge which extends outwardly a distance perpendicular to said base along the length of the front end of said base to preclude the device being secured from extending past the front end of the base but not so far as to preclude normal operation of the set top box.

2. The locking mount of claim 1 wherein said springy retainers are spaced a distance apart to engage specific points on the bottom surface of the set top box.

* * * * *